United States Patent
Roberson et al.

(10) Patent No.: US 9,176,633 B2
(45) Date of Patent: Nov. 3, 2015

(54) SENSOR DEVICE AND METHOD FOR ESTIMATING NOISE IN A CAPACITIVE SENSING DEVICE

(71) Applicant: SYNAPTICS INCORPORATED, San Jose, CA (US)

(72) Inventors: Jeremy Roberson, San Francisco, CA (US); Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 32 days.

(21) Appl. No.: 14/231,314

(22) Filed: Mar. 31, 2014

(65) Prior Publication Data
US 2015/0277621 A1    Oct. 1, 2015

(51) Int. Cl.
G06F 3/044        (2006.01)
H04J 13/00        (2011.01)
G06F 3/041        (2006.01)

(52) U.S. Cl.
CPC ............. *G06F 3/044* (2013.01); *G06F 3/0418* (2013.01); *H04J 13/004* (2013.01); *G06F 2203/04111* (2013.01)

(58) Field of Classification Search
CPC ....... G06F 3/044; G06F 3/0418; H04J 13/004
See application file for complete search history.

(56) References Cited

U.S. PATENT DOCUMENTS

| | | |
|---|---|---|
| 4,170,025 A | 10/1979 | Benkley et al. |
| 4,459,541 A | 7/1984 | Fielden et al. |
| 4,733,222 A | 3/1988 | Evans |
| 4,974,236 A | 11/1990 | Gurcan et al. |
| 5,304,937 A | 4/1994 | Meyer |

(Continued)

FOREIGN PATENT DOCUMENTS

| | | |
|---|---|---|
| EP | 0749086 A1 | 12/1996 |
| EP | 1624399 A1 | 2/2006 |

(Continued)

OTHER PUBLICATIONS

Korean Intellectual Property Office International Search Report mailed Feb. 23, 2012 for International Application. No. PCT/US2011/051998, filed Sep. 16, 2011.

(Continued)

*Primary Examiner* — Kevin Nguyen
(74) *Attorney, Agent, or Firm* — Osha • Liang LLP (57) ABSTRACT

A processing system configured to sense an input object in a sensing region of a sensing device including a transmitter module coupled to a first transmitter electrode and a second transmitter electrode and configured to simultaneously apply a first transmitter signal to the first transmitter electrode and a second transmitter signal to the second transmitter electrode, wherein the first transmitter signal is based on a first one of a plurality of distinct codes and the second transmitter signal is based on a second one of the plurality of distinct codes. The processing system also includes a receiver module including receiver circuitry coupled to a first receiver electrode and configured to receive a first resulting signal with the first receiver electrode, the first resulting signal comprising effects corresponding to the first and second transmitter signals and a noise component. The processing system is configured to determine an estimate of the noise component using a third one of the plurality of distinct codes which is not associated with a transmitter signal.

20 Claims, 4 Drawing Sheets

(56) References Cited

U.S. PATENT DOCUMENTS

| | | | |
|---|---|---|---|
| 5,305,017 A | 4/1994 | Gerpheide | |
| 5,648,642 A | 7/1997 | Miller | |
| 5,666,113 A | 9/1997 | Logan | |
| 5,787,126 A | 7/1998 | Itoh et al. | |
| 5,790,106 A | 8/1998 | Hirano et al. | |
| 5,825,352 A | 10/1998 | Bisset et al. | |
| 5,841,078 A | 11/1998 | Miller | |
| 5,861,875 A | 1/1999 | Gerpheide | |
| 5,880,411 A | 3/1999 | Gillespie et al. | |
| 5,889,236 A | 3/1999 | Gillespie et al. | |
| 5,917,906 A | 6/1999 | Thornton | |
| 5,924,708 A | 7/1999 | Bisaillon et al. | |
| 5,940,526 A | 8/1999 | Setlak et al. | |
| 5,963,679 A | 10/1999 | Setlak | |
| 6,067,368 A | 5/2000 | Setlak et al. | |
| 6,259,804 B1 | 7/2001 | Setlak et al. | |
| 6,392,167 B1 | 5/2002 | Nakagawa | |
| 6,570,557 B1 | 5/2003 | Westerman et al. | |
| 6,621,487 B2 | 9/2003 | Iwasaki et al. | |
| 6,704,005 B2 | 3/2004 | Kato et al. | |
| 6,771,280 B2 | 8/2004 | Fujisaki et al. | |
| 6,788,288 B2 | 9/2004 | Ano | |
| 7,075,316 B2 | 7/2006 | Umeda et al. | |
| 7,078,918 B2 | 7/2006 | Umeda et al. | |
| 7,084,645 B1 | 8/2006 | Umeda et al. | |
| 7,106,720 B2 | 9/2006 | Ozluturk et al. | |
| 7,292,229 B2 | 11/2007 | Morag et al. | |
| 7,333,089 B1 | 2/2008 | Gard | |
| 7,372,455 B2 | 5/2008 | Perski et al. | |
| 7,451,050 B2 | 11/2008 | Hargreaves | |
| 7,616,786 B2 | 11/2009 | Setlak | |
| 7,643,010 B2 | 1/2010 | Westerman et al. | |
| 7,812,827 B2 | 10/2010 | Hotelling et al. | |
| 7,868,874 B2 | 1/2011 | Reynolds | |
| 7,920,134 B2 | 4/2011 | Krah | |
| 8,338,724 B2 | 12/2012 | Reynolds | |
| 2002/0049070 A1 | 4/2002 | Bick | |
| 2002/0050983 A1 | 5/2002 | Liu et al. | |
| 2002/0173337 A1 | 11/2002 | Hajimiri et al. | |
| 2002/0185981 A1 | 12/2002 | Dietz et al. | |
| 2003/0030628 A1 | 2/2003 | Sato et al. | |
| 2003/0035570 A1 | 2/2003 | Benkley, III | |
| 2003/0067449 A1 | 4/2003 | Yoshikawa et al. | |
| 2003/0076306 A1 | 4/2003 | Zadesky et al. | |
| 2003/0133432 A1 | 7/2003 | Moerder | |
| 2004/0056785 A1 | 3/2004 | Webster et al. | |
| 2004/0056849 A1 | 3/2004 | Lohbihler et al. | |
| 2004/0081339 A1 | 4/2004 | Benkley, III | |
| 2005/0005703 A1 | 1/2005 | Saito et al. | |
| 2005/0024065 A1 | 2/2005 | Umeda et al. | |
| 2005/0052425 A1 | 3/2005 | Zadesky et al. | |
| 2005/0073324 A1 | 4/2005 | Umeda et al. | |
| 2005/0122785 A1 | 6/2005 | Umeda et al. | |
| 2005/0150697 A1 | 7/2005 | Altman et al. | |
| 2006/0111074 A1 | 5/2006 | Petilli et al. | |
| 2006/0293017 A1 | 12/2006 | Kim et al. | |
| 2007/0047669 A1 | 3/2007 | Mak et al. | |
| 2007/0062852 A1 | 3/2007 | Zachut et al. | |
| 2007/0109274 A1 | 5/2007 | Reynolds | |
| 2007/0296709 A1 | 12/2007 | GuangHai | |
| 2008/0158167 A1 | 7/2008 | Hotelling et al. | |
| 2008/0158182 A1 | 7/2008 | Westerman | |
| 2008/0192018 A1 | 8/2008 | Park et al. | |
| 2009/0019949 A1 | 1/2009 | Rothkopf et al. | |
| 2009/0135973 A1 | 5/2009 | He | |
| 2009/0143031 A1 | 6/2009 | Shah | |
| 2009/0189867 A1 | 7/2009 | Krah et al. | |
| 2009/0225036 A1 | 9/2009 | Wright | |
| 2009/0273579 A1 | 11/2009 | Zachut et al. | |
| 2009/0322351 A1 | 12/2009 | Mcleod | |
| 2009/0322578 A1 | 12/2009 | Petrovic | |
| 2010/0059295 A1 | 3/2010 | Hotelling et al. | |
| 2010/0060589 A1 | 3/2010 | Wilson | |
| 2010/0060591 A1 | 3/2010 | Yousefpor et al. | |
| 2010/0079083 A1 | 4/2010 | Seguine | |
| 2010/0110037 A1 | 5/2010 | Huang et al. | |
| 2010/0159858 A1 | 6/2010 | Dent et al. | |
| 2010/0189197 A1 | 7/2010 | Nakatani | |
| 2010/0321331 A1 | 12/2010 | Oda et al. | |
| 2011/0037724 A1 | 2/2011 | Paulsen et al. | |
| 2011/0042153 A1 | 2/2011 | Wu et al. | |
| 2011/0063993 A1 | 3/2011 | Wilson et al. | |
| 2011/0084857 A1 | 4/2011 | Marino et al. | |
| 2012/0013546 A1 | 1/2012 | Westhues et al. | |
| 2012/0056841 A1 | 3/2012 | Krenik et al. | |
| 2012/0068949 A1 | 3/2012 | Washburn et al. | |
| 2012/0068966 A1 | 3/2012 | Washburn et al. | |
| 2012/0182259 A1* | 7/2012 | Han | 345/174 |
| 2014/0035601 A1* | 2/2014 | Fujiyoshi | 324/684 |
| 2014/0098032 A1* | 4/2014 | Ng et al. | 345/173 |
| 2014/0192007 A1* | 7/2014 | Westhues et al. | 345/174 |

FOREIGN PATENT DOCUMENTS

| | | | |
|---|---|---|---|
| JP | 2003022158 A | | 1/2003 |
| JP | 2005098789 A | | 4/2005 |
| JP | 2005114362 A2 | | 4/2005 |
| KR | 20080075611 A | | 8/2008 |
| KR | 20100042761 A | | 4/2010 |
| WO | 0247018 A2 | | 6/2002 |
| WO | 2004107146 A2 | | 12/2004 |

OTHER PUBLICATIONS

USPTO, Ex Parte Quayle Office Action for U.S. Appl. No. 12/962,096, dated Jun. 19, 2012.

USPTO, Ex parte Quayle Office Action for U.S. Appl. No. 13/679,355, mailed Apr. 5, 2013.

USPTO, Final Office Action in U.S. Appl. No. 13/161,267 mailed Sep. 10, 2013.

USPTO, Notice of Allowance in U.S. Appl. No. 13/170,035, mailed Jan. 22, 2014.

USPTO, Notice of Allowance in U.S. Appl. No. 13/335,512, mailed Feb. 28, 2014.

USPTO, Office Action in U.S. Appl. No. 13/161,267 mailed Apr. 4, 2013.

USPTO, Response to Final Office Action in U.S. Appl. No. 13/161,267 filed Jan. 10, 2014.

USPTO, Response to Office Action in U.S. Appl. No. 13/161,267 filed Jun. 27, 2013.

USPTO, Notice of Allowance in U.S. Appl. No. 14/177,566 mailed Apr. 2, 2014.

USPTO, Office Action in U.S. Appl. No. 13/101,915 mailed Dec. 20, 2013.

USPTO, Response to Office Action in U.S. Appl. No. 13/101,915 filed Mar. 20, 2014.

Cichocki, et al.; "A Switched-Capacitor Interface for Capacitive Sensors Based on Relaxation Oscillators"; IEEE Journal; Oct. 1990; pp. 797-799; vol. 39, No. 5.

Huang, et al.; "Electronic Transducers for Industrial Measurement of Low Value Capacitances"; J. Phys. E: Sci. Instrum. 21 1988; pp. 242-250; IOP Publishing Printed in the U.K.

Philipp, Hal; "Charge Transfer Sensing", pp. 1-9; Copyright 1997.

Smith, et al.; "Code-Division Multiplexing of a Sensor Channel: A Software Implementation"; IEEE Journal; Apr. 1999; pp. 725-731; vol. 17, No. 4.

Smith, et al.; "Electric Field Sensing for Graphical Interfaces"; IEEE Computer Graphics and Applications; May/Jun. 1998; pp. 54-60.

Vigoda, Benjamin; "A Nonlinear Dynamic System for Spread Spectrum Code Acquisition"; MIT Media Laboratory; pp. 10-90.

West, J.DK "The Application of the Asymmetric Polyphase Filter in an SSB Transceiver" Grinel Natal Branch of Grinaker Electronics, IEEE 1991.

Yam, Y.-O. et al "Innovative Demodulation Method for SSB Technique" IEE Proc.-Circuits Devices Syst., vol. 146, No. 3, Jun. 1999.

Yamada, et al.; "A Switched-Capacitor Interface for Capacitive Pressure Sensors", IEEE Journal; Feb. 1992; pp. 81-86; vol. 41, No. 1.

Zimmerman, et al.; "Applying Electric Field Sensing to Human-Computer Interfaces", MIT Media Laboratory; pp. 1-8; to be published in (IEEE SIG) CHI May 1995.

(56) References Cited

OTHER PUBLICATIONS

Japan Patent Office Notice of Reasons for Rejection mailed Feb. 29, 2012 for Patent Application No. P2008-54117 4.
Japan Patent Office Response to Notice of Reasons for Rejection filed May 31, 2012 for Patent Application No. 2008-541174.
Japan Patent Office Final Notice of Reasons for Rejection mailed Feb. 19, 2013 for Patent Application No. 2008-541174.
Japan Patent Office Response to Final Notice of Reasons for Rejection filed May 10, 2013 for Patent Application No. 2008-541174.
Japan Patent Office Decision to Grant Patent mailed Aug. 6, 2013 for Patent Application No. 2008-541174.
Japan Patent Office Notice of Allowance mailed Feb. 25, 2014 for Patent Application No. 2013-100309.
European Patent Office Office Action in European Patent Application No. 06816952.3 mailed Dec. 11, 2009.
European Patent Office Response to Office Action in European Patent Application No. 06816952.3 filed Apr. 21, 2010.
SIPO Office Action for Application No. 200680042701.5, mailed Sep. 4, 2009.
SIPO Response to Office Action for Application No. 200680042701.5, filed Jan. 5, 2010.
SIPO Office Action for Application No. 200680042701.5, mailed Jun. 28, 2010.
SIPO Response to Office Action for Application No. 200680042701.5, filed Sep. 10, 2010.
SIPO Office Action for Application No. 200680042701.5, mailed Nov. 23, 2010.
SIPO Response to Office Action for Application No. 200680042701.5, filed Jan. 30, 2011.
SIPO Office Action for Application No. 200680042701.5, mailed May 25, 2011.
SIPO Response to Office Action for Application No. 200680042701.5, filed Aug. 6, 2011.
SIPO Office Action for Application No. 200680042701.5, mailed Sep. 14, 2011.
SIPO Response to Office Action for Application No. 200680042701.5, filed Nov. 28, 2011.
SIPO Notification to Grant Patent Right for Application No. 200680042701.5, mailed Mar. 8, 2012.
The International Bureau of WIPO, PCT International Preliminary Report on Patentability in PCT International Application No. PCT/US2011/051998, mailed Mar. 28, 2013.
International Searching Authority, PCT International Search Report and Written Opinion of the International Searching Authority in PCT International Application No. PCT/US2011/051998, mailed Feb. 23, 2012.
International Searching Authority, International Search Report for International Application No. PCT/US2006/040266, mailed Mar. 30, 2007.
International Searching Authority, International Written Opinion for International Application No. PCT/US2006/040266, mailed May 15, 2008.
USPTO, Office Action in U.S. Appl. No. 11/274,999, mailed Jan. 28, 2009.
USPTO, Response to Office Action in U.S. Appl. No. 11/274,999, filed Apr. 27, 2009.
USPTO, Final Office Action in U.S. Appl. No. 11/274,999, mailed Jul. 16, 2009.
USPTO, Response to Final Office Action in U.S. Appl. No. 11/274,999, filed Oct. 16, 2009.
USPTO, Office Action in U.S. Appl. No. 11/274,999, mailed Jan. 5, 2010.
USPTO, Response to Office Action in U.S. Appl. No. 11/274,999, filed Apr. 5, 2010.
USPTO, Supplemental Response to Office Action in U.S. Appl. No. 11/274,999, filed May 3, 2010.
USPTO, Final Office Action in U.S. Appl. No. 11/274,999, mailed Jul. 13, 2010.
USPTO, Response to Final Office Action in U.S. Appl. No. 11/274,999, filed Aug. 25, 2010.
USPTO, Notice of Allowance in U.S. Appl. No. 11/274,999, mailed Sep. 3, 2010.
USPTO, Notice of Allowance in U.S. Appl. No. 12/962,096, mailed Aug. 20, 2012.
USPTO, Notice of Allowance in U.S. Appl. No. 13/679,355, mailed Jun. 11, 2013.
USPTO, Notice of Allowance in U.S. Appl. No. 12/962,110, mailed Jul. 16, 2012.
USPTO, Office Action in U.S. Appl. No. 13/233,790, mailed Aug. 15, 2013.
USPTO, Office Action in U.S. Appl. No. 13/233,781, mailed Jul. 18, 2013.
The International Bureau of WIPO, PCT International Preliminary Report on Patentability in PCT International Application No. PCT/US2006/040266, mailed May 20, 2008.

* cited by examiner

SENSOR DEVICE AND METHOD FOR ESTIMATING NOISE IN A CAPACITIVE SENSING DEVICE

FIELD OF THE INVENTION

This invention generally relates to sensor devices using code division multiplexed (CDM) signaling, and more specifically relates to simultaneously measuring interference and touch sensing in hardware.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Presently known capacitive sensing devices temporarily suspend the application of drive signals onto transmitter electrodes in order to estimate system noise. However, suppressing drive signals can degrade device performance. This can limit the flexibility and usability of the sensor device, and negatively impact the user experience. Thus, there exists a need for capacitive sensing devices that overcome these shortcomings.

BRIEF SUMMARY OF THE INVENTION

The embodiments of the present invention provide a device and method that facilitates improved device usability. Specifically, the device and method provide improved user interface functionality by measuring and estimating a noise component using a dedicated noise descrambler.

In various embodiments, a capacitive input sensor includes a processing system configured to sense an input object in a sensing region, the processing system drive circuitry coupled to a first transmitter electrode and a second transmitter electrode and configured to simultaneously apply a first transmitter signal to the first transmitter electrode and a second transmitter signal to the second transmitter electrode, wherein the first transmitter signal is based on a first one of a plurality of distinct codes and the second transmitter signal is based on a second one of the plurality of distinct codes. The processing system also includes a receiver module including receiver circuitry coupled to a first receiver electrode and configured to receive a first resulting signal with the first receiver electrode, the first resulting signal including effects (e.g., electrical effects) corresponding to the first and second transmitter signals and a noise component. The processing system is configured to determine an estimate of the noise component using a third one of the plurality of distinct codes which is not associated with a transmitter signal.

By configuring the processing system in this way, the input device and method can determine an up to date noise estimate and adjust operational parameters accordingly, thereby minimizing unnecessary performance degradation. Thus, the sensor device provides increased user interface flexibility.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, spread spectrum techniques can be used in an input device such as a touchpad to improve noise immunity and/or to provide performance enhancements. Code division multiplexing (CDM), for example, can be used to create two or more distinct transmitterion signals that are applied to sensing electrode(s) within the sensor. The effect of noise on multiple signal channels may be more uniform so that a minimum signal-to-noise ratio (SNR) is maintained for each useful signal channel. This concept can be exploited even further by selecting digital codes to produce frequency-domain signals that avoid known sources of noise. Spread spectrum techniques can therefore apply increased power to the sensing region while reducing the effects of noise, thereby resulting in a significantly improved SNR for the sensor in comparison to conventional time-domain multiplexing techniques of a comparable sample period. Spread spectrum techniques applied within the sensor may enable other beneficial sensor designs and features as well.

Figure 1:
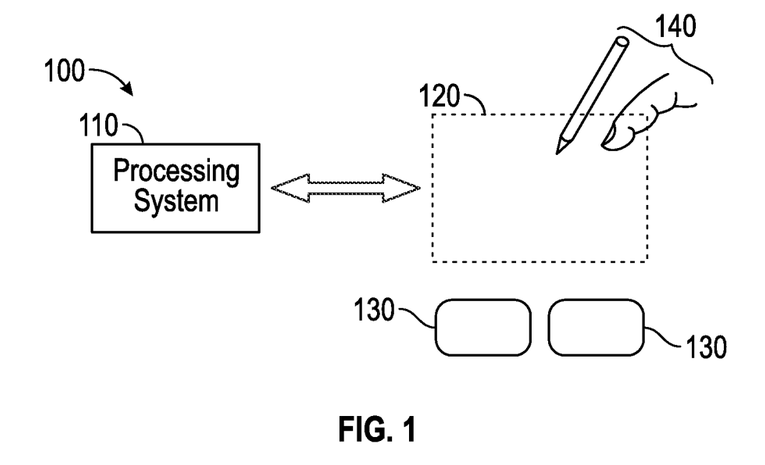
FIG. 1 is a block diagram of an exemplary system that includes an input device in accordance with various embodiments.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processing system of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processing systems (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
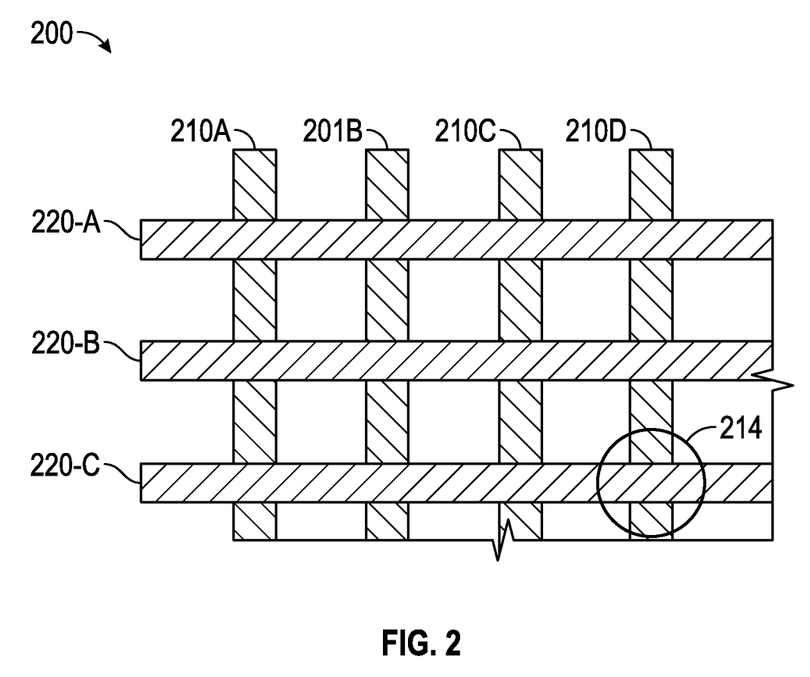
FIG. 2 is schematic view of a portion of an exemplary sensor electrode pattern and associated capacitance values for the X and Y coordinates in accordance with various embodiments.

FIG. 2 shows a portion of an example sensor electrode pattern configured to sense objects in a sensing region associated with the pattern, according to some embodiments. For clarity of illustration and description, FIG. 2 shows a pattern (e.g., an array) 200 of represented schematically as rectangles. This sensor electrode pattern comprises a plurality of transmitter electrodes 220A-C and a plurality of receiver electrodes 210A-D.

Transmitter electrodes 220 and receiver electrodes 210 are typically ohmically isolated from each other. That is, one or more insulators separate the transmitter electrodes from the receiver electrodes and prevent them from electrically shorting to each other. In some embodiments, receiver electrodes 210 and transmitter electrodes 220 are separated by insulative material disposed between them at cross-over areas; in such constructions, the electrode junctions (or pixels) may be formed with jumpers connecting different portions of the same electrode. In some embodiments, the transmitter and receiver electrodes are separated by one or more layers of insulative material. In some other embodiments, the transmitter and receiver electrodes are separated by one or more substrates; for example, they may be disposed on opposite sides of the same substrate, or on different substrates that are laminated together. Moreover, one or more of the sensor electrodes can be used for both capacitive sensing and for updating the display. Alternatively, the sensor electrodes may be implemented in a single layer design where the sensor electrodes do not overlap in the sensing region.

With continued reference to FIG. 2, the transmitter electrodes 220 extend along the "X" direction, and the receiver electrodes 210 extend along the "Y" direction. When an input object is placed at or near the surface of the sensing region, for example, at location 214 (corresponding to the intersection of electrodes 220C and 210D), the sensor electrodes in pattern 200 capacitively sense the presence of the input object.

A capacitive image may be built from data received with the receiver electrodes. As noted above, the embodiments of the invention can be implemented with a variety of different types and arrangements of capacitive sensor electrodes. For example, the electrodes for sensing may be disposed in a first direction (e.g., the "X" direction), a second direction (e.g., the "Y" direction), or in any suitable orthogonal, parallel, or hybrid configuration such as polar coordinates (e.g., "r" and "θ"). In these embodiments the sensor electrodes themselves are commonly arranged in a circle or other looped shape to provide "θ", with the shapes of individual sensor electrodes used to provide "r". In other embodiments, the sensor electrodes may be formed on the same layer, or the input device can be implemented with electrode arrays that are formed on multiple substrate layers.

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 3:
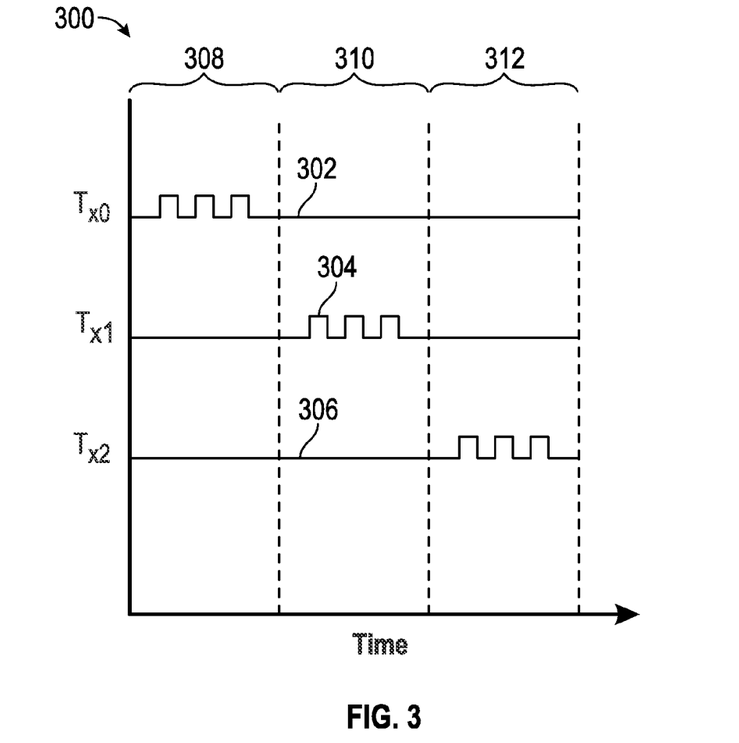
FIG. 3 is a schematic view of exemplary time multiplexed waveforms applied to transmitters in accordance with various embodiments.

With reference to FIGS. 2 and 3, FIG. 3 is a schematic diagram of exemplary time multiplexed waveforms used to modulate transmitter electrodes. More particularly, a first waveform 302 is applied to a first transmitter $T_{X0}$ (analogous to transmitter 220A) in a first time period 308, a second waveform 304 is applied to a second transmitter $T_{X1}$ (analogous to transmitter 220B) in a second time period 310, and a third waveform 306 is applied to a third transmitter $T_{X2}$ (analogous to transmitter 220C) in a third time period 308. By driving only a single transmitter during a particular time period, the resulting signals on the receiver electrodes may be processed to determine the location (e.g., the X and Y coordinates) of an input object in the sensing region may be determined.

Those skilled in the art will appreciate that as the signal to noise ratio (SNR) of the resulting signals decreases due to increased system noise, errors can occur in detecting input objects. To compensate for the increased noise and reduce the likelihood of errors, various operating parameters may be adjusted in the presence of noise, such as decreasing the frame rate (which corresponds to increasing the length of a data sampling window). While this can reduce detection errors, it can also degrade device performance and negatively affect the quality of the user experience. Thus, it is desired to adjust system operating parameters only as and when necessary to compensate for high noise conditions. Accordingly, it is desirable to provide an up to date estimate of system noise.

One technique for estimating noise involves measuring resulting signals while suppressing drive signals. However, this technique can be error prone inasmuch as input objects can go undetected while drive signals are suppressed. In accordance with various embodiments, systems and methods are provided for estimating noise while simultaneously applying drive signals to transmitter electrodes and processing resulting signals received at receiver electrodes.

Figure 4:
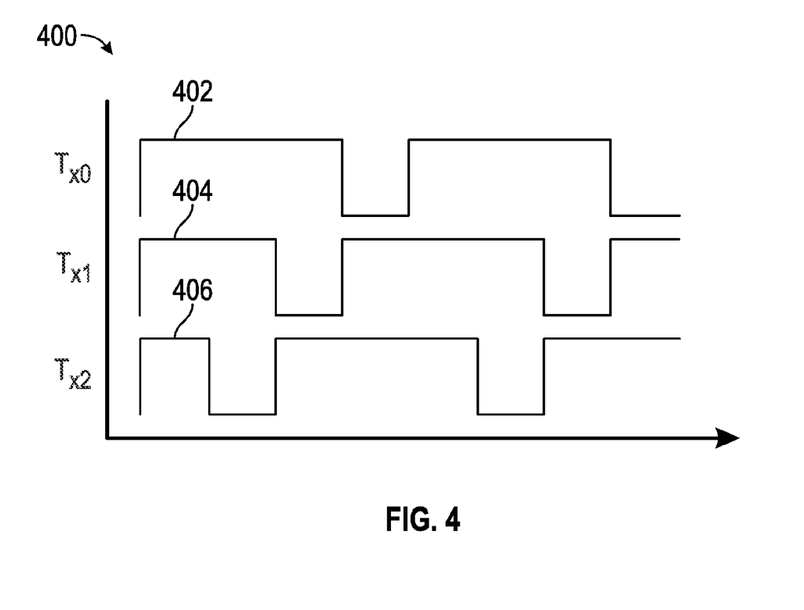
FIG. 4 is a schematic view of an exemplary waveforms simultaneously applied to transmitters in accordance with various embodiments.

FIG. 4 is a schematic view of exemplary waveforms simultaneously applied to transmitter electrodes. More particularly, the processing system may be configured to simultaneously apply a first waveform 402 to a first transmitter $T_{X0}$, a second waveform 404 to a second transmitter $T_{X1}$, and a third waveform 406 to a third transmitter $T_{X2}$.

The processing system may be configured to produce digital codes that can be used in generating the transmitter signals 402-406. The number, size and types of digital codes produced may vary significantly, but in various embodiments the codes may be strictly or substantially orthogonal to each other, and may be of sufficient length to apply a unique digital code to each transmitter electrode in the sensing region. Alternatively, the codes may be of sufficient length to apply a unique digital code to each of a subset of transmitter electrodes which are simultaneously driven.

The discrete codes may be binary, ternary, or generically multi-level, and may indicate both driven and un-driven states (tri-state). Various circuits, modules and techniques for generating digital codes based on pseudo-random codes, Hadamard codes, Walsh-Hadamard codes, m-sequences, Gold codes, Kasami codes, Barker codes, delay line multiple tap sequences, and/or the like. Alternatively, digital codes may be pre-determined and stored in a lookup table or other data structure associated with the processing system. Moreover, although FIG. 4 illustrates codes in the form of square waves, other modulation techniques (e.g., sine waves) are also contemplated by the present disclosure.

The term "substantially orthogonal" in the context of the distinct digital codes is intended to convey that the distinct codes need not be perfectly orthogonal from each other in the mathematical sense, so long as the distinct codes are able to produce meaningful independent results. Strict orthogonality may thus be traded off for various other properties such as correlation, spectra, or compressibility. Similarly, the term "sensing zone" is intended to convey that a single code could be applied to multiple transmitter electrodes to create a single zone of sensitivity that encompasses a larger portion of the sensing region than any of the individual transmitter electrodes. Also, more than one code could be applied to an electrode creating overlapping or spatially filtered "sensing zones". For example phase delayed or "shifted" versions of the same code sequence can be distinct and substantially orthogonal such that they are readily distinguishable. In various cases, interpolation between phase shifts may even be possible.

Figure 5:
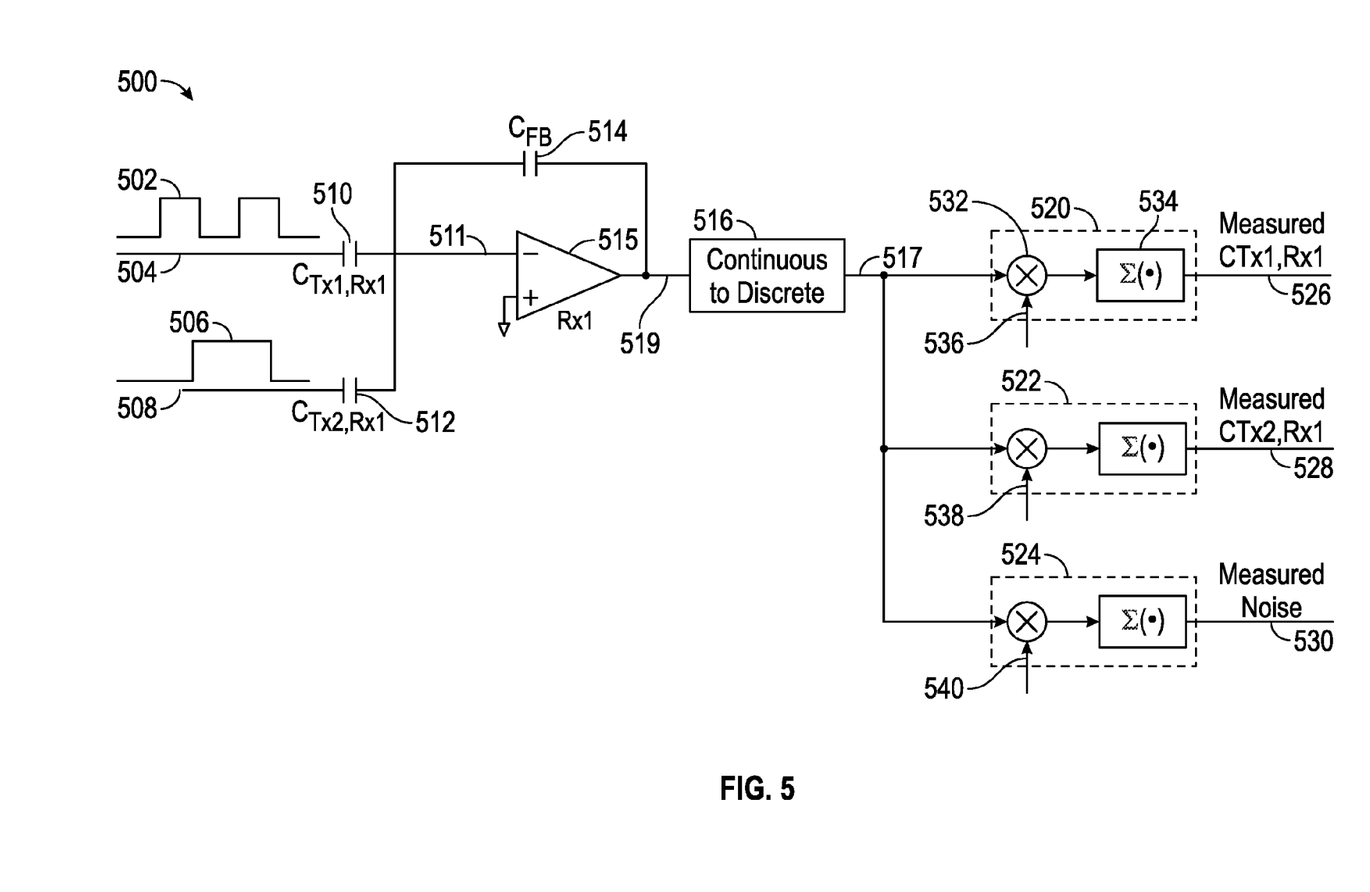
FIG. 5 is a schematic block diagram of exemplary receiver circuitry including a plurality of descrambler modules corresponding to a plurality of transmitter signals, plus an additional descrambler module for noise estimation in accordance with various embodiments.

FIG. 5 is a schematic block diagram of an exemplary receiver module 500 including receiver electrodes 504 and 508, and receiver circuitry comprising a plurality of descrambler modules corresponding to a plurality of transmitter signals, plus an additional descrambler module for noise estimation in accordance with various embodiments. More particularly, the receiver circuitry includes an integrator 515, a feedback capacitor 514, and a sampling module 516. In capacitive sensing devices, a change in measured capacitance is referred to as "delta C". In the context of FIG. 5, the change in measured capacitance for a particular one of N transmitters is referred to as delta $C_{TN}$, where N represents the number of transmitters processed by the receiver circuitry. That is, each one of M receiver electrodes has an associated receiver circuit, and each receiver circuit is configured to simultaneously measure the delta $C_T$ for each transmitter by multiplying the integrator output 517 by a unique sequence for each transmitter. As described in greater detail below, an estimate of the noise may be obtained by multiplying the integrator output 517 by a sequence 540 that is orthogonal to all of the distinct codes used to generate the transmitted waveforms. Estimating the noise in this manner (e.g., using hardware) simplifies the associated firmware and improves overall device performance.

More particularly and with continued reference to FIG. 5, a first transmitter signal 502 and a second transmitter signal 506 are simultaneously applied to a first transmitter electrode 504 and a second transmitter electrode 508, respectively. A first measured capacitance 510 embodies effects corresponding to the first transmitter signal 502, and a second capacitance 512 embodies effects corresponding to the second transmitter signal 506. The resulting signal 511 (corresponding to the combined delta $C_{TN}$ for N transmitters) is applied to the integrator 515, and the integrator output 519 is sampled by the continuous-to-discrete module 516. The sampled output 517 is applied to (N+1) descrambler circuits, corresponding to N descramblers for each of N transmitted signals, plus one (or more) additional descrambler(s) dedicated to noise estimation.

In the illustrated embodiment, the sampled integrator output 517 is multiplied by a unique sequence for each transmitter. In particular, output 517 is simultaneously applied to a first descrambler circuit 520 corresponding to the first transmitter signal 502, a second descrambler circuit 522 corresponding to the second transmitter signal 506, a noise descrambler circuit 524. In the illustrated embodiment, each descrambler circuit (sometimes referred to as a correlator or matched filter) may include a multiplier 532 and a summer 534. The summer may be implemented in any suitable manner, such as using an analog integrator or a digital accumulator. A first unique sequence 536 is applied to the multiplier associated with the first descrambler module 520 resulting in output 526 representing the variable capacitance due to the first transmitter signal 502 on the first transmitter 504. Similarly, a second unique sequence 538 is applied to the multiplier associated with the second descrambler module 522 resulting in output 528 representing the variable capacitance due to the second transmitter signal 506 on the second transmitter 508. Finally, a unique sequence 540 is applied to the multiplier associated with the noise descrambler module 524 resulting in output 530 representing the estimated system noise (also referred to herein as the interference component).

Figure 6:
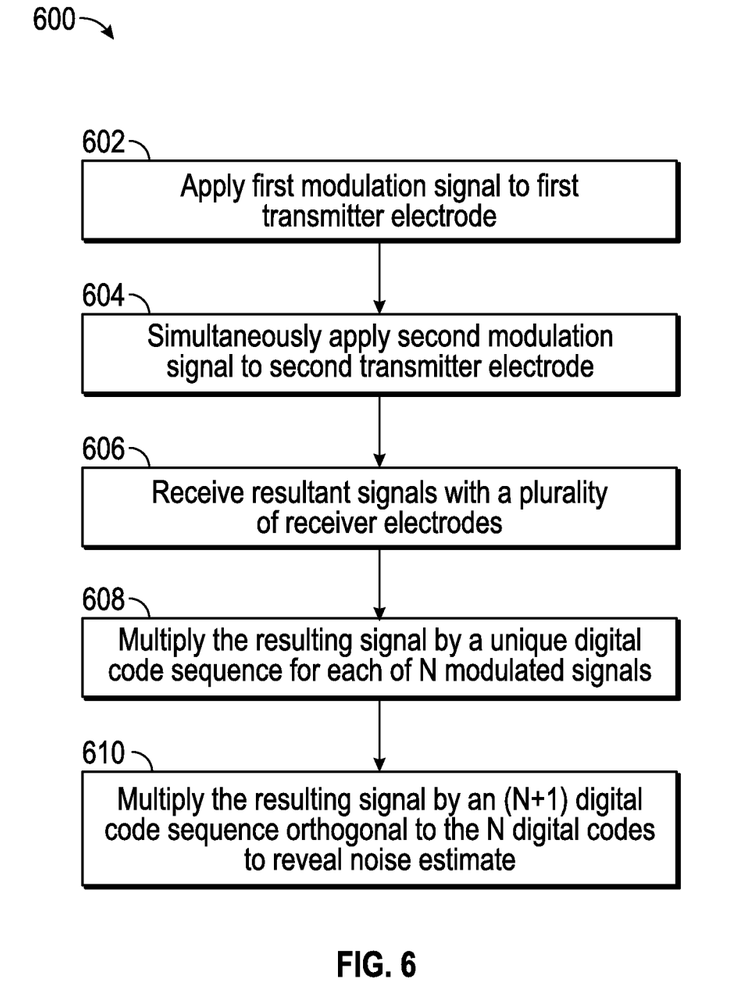
FIG. 6 is a flow diagram of an exemplary method for estimating noise in a capacitive sensor environment in accordance with various embodiments.

FIG. 6 is a flow diagram of an exemplary method for estimating noise in a capacitive sensor environment in accordance with various embodiments. More particularly, a method 600 for capacitive sensing includes simultaneously applying a first transmitter signal to a first transmitter electrode (Task 602) and a second transmitter signal to a second transmitter electrode (Task 604), wherein the first transmitter signal is based on a first one of a plurality of distinct digital codes and the second transmitter signal is based on a second one of the plurality of distinct digital codes. The method 600 further involves receiving resulting signals with a plurality of receiver electrodes (Task 606), wherein each resulting signal comprises effects corresponding to the first and second transmitter signals and an interference component. The method 600 further involves determining an estimate of the interference component using a third one of the plurality of distinct digital codes. More particularly, the method 600 involves multiplying the resulting signal (Task 608) by a unique digital code sequence for each of N transmitted signals to reveal the respective transmitted signals. Finally, the method 600 involves multiplying the resulting signal (Task 610) by an (N+1) digital code sequence orthogonal to the N digital codes to reveal the noise estimate.

A processing system is thus provided for sensing an input object in a sensing region of a sensing device. The processing system includes: a transmitter module coupled to a first transmitter electrode and a second transmitter electrode and configured to simultaneously apply a first transmitter signal to the first transmitter electrode and a second transmitter signal to the second transmitter electrode, wherein the first transmitter signal is based on a first one of a plurality of distinct codes and the second transmitter signal is based on a second one of the plurality of distinct codes; and a receiver module including receiver circuitry coupled to a first receiver electrode and configured to receive a first resulting signal with the first receiver electrode, the first resulting signal comprising effects corresponding to the first and second transmitter signals and a noise component;

wherein the processing system is configured to determine an estimate of the noise component using a third one of the plurality of distinct codes which is not associated with (or does not correspond to) a transmitter signal.

In an embodiment, the first, second, and third digital codes are mutually orthogonal digital codes.

In an embodiment, the processing system is further configured to demodulate the resulting signal using the first and second digital codes to determine indicia of the first and second transmitter signals, respectively.

In an embodiment, the processing system is further configured to demodulate the resulting signal to determine positional information for the input object based on the resulting signal.

In an embodiment, the processing system is further configured to compare the noise estimate to a predetermined threshold value.

In an embodiment, the processing system is further configured to select an operating mode based on whether the noise estimate exceeds the threshold value.

In an embodiment, selecting the operating mode may include adjusting a frame rate at which the input object is sensed in the sensing region.

In an embodiment, the receiver circuitry may include: a first descrambler circuit for determining the indicia of the first transmitter signal; a second descrambler circuit for determining the indicia of the second transmitter signal; a third descrambler circuit for determining a first attribute of the noise component; and a fourth descrambler circuit for determining a second attribute of the noise component, wherein the first attribute may correspond to a value of an estimated noise component, and the second attribute may correspond to a harmonic associated with the estimated noise component.

In an embodiment, the receiver circuitry may also include: a first multiplier circuit for applying the first digital code to the first descrambler circuit; a second multiplier circuit for applying the second digital code to the second descrambler circuit; and a third multiplier circuit for applying the third digital code to the third descrambler circuit. In various embodiments the multiplier function may be implemented in a correlator circuit.

In an embodiment, the transmitter module may be coupled to N ohmically isolated transmitter electrodes and configured to apply a unique one of N transmitter signals to each transmitter electrode, wherein the N transmitter signals are distinct digital codes; the receiver module may be coupled to M ohmically isolated receiver electrodes, each configured to receive a respective resulting signal; where N and M are positive integers; and the receiver circuitry comprises (N+1) discrete descrambler circuits for each of the M receiver electrodes.

In an embodiment, the processing system is configured to determine a respective estimated noise component for each of the M receiver electrodes.

In an embodiment, the receiver module may include a second receiver electrode configured to receive a second resulting signal, and the processing system may be further configured to determine positional information for at least two input objects in the sensing region based on the first and second resulting signals.

In an embodiment, the plurality of distinct digital codes may be based on Pseudo-Random codes, Hadamard codes, Walsh-Hadamard codes, m-sequences, Gold codes, Kasami codes, Barker codes, and/or delay line multiple tap sequences.

A sensing device is provided which includes: a plurality of transmitter electrodes; a plurality of receiver electrodes; and a processing system individually coupled to each of the plurality of transmitter electrodes and the plurality of receiver electrodes, the processing system configured to: simultaneously apply a first transmitter signal to a first transmitter electrode of the plurality of transmitter electrodes and a second transmitter signal to a second transmitter electrode of the plurality of transmitter electrodes, wherein the first transmitter signal is based on a first one of a plurality of distinct digital codes and the second transmitter signal is based on a second one of the plurality of distinct digital codes; receive resulting signals with the plurality of receiver electrodes, wherein each resulting signal comprises: i) effects corresponding to the first and second transmitter signals; and ii) a noise component; and determine an estimate of the noise component for each resulting signal using a third one of the plurality of distinct digital codes.

In an embodiment, the third one of the plurality of distinct digital codes is not associated with a transmitter signal.

In an embodiment, the first, second, and third digital codes are mutually orthogonal and each is based on at least one of: Pseudo-Random codes, Walsh-Hadamard codes, m-sequences, Gold codes, Kasami codes, Barker codes, and delay line multiple tap sequences.

In an embodiment, the processing system is further configured to: demodulate the resulting signals to determine positional information for an input object based on the resulting signals; and compare the noise estimates to a predetermined threshold value, and to select an operating mode based on whether at least one of the noise estimates exceeds the threshold value.

In an embodiment, the processing system may include, for each receiver electrode, a first filter for isolating indicia of the first transmitter signal, a second filter for isolating indicia of the second transmitter signal, and a noise filter for isolating a respective noise component.

A method for capacitive sensing is also provided, the method including: simultaneously applying a first transmitter signal to a first transmitter electrode and a second transmitter signal to a second transmitter electrode, wherein the first transmitter signal is based on a first one of a plurality of distinct digital codes and the second transmitter signal is based on a second one of the plurality of distinct digital codes; receiving resulting signals with a plurality of receiver electrodes, wherein each resulting signal comprises effects corresponding to the first and second transmitter signals and an interference component; and determining an estimate of the interference component using a third one of the plurality of distinct digital codes.

In an embodiment, the step of determining may include multiplying the resulting signal by the third digital code using a descrambler circuit.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system configured to sense an input object in a sensing region of a sensing device, the processing system comprising:
    a transmitter module coupled to a first transmitter electrode and a second transmitter electrode and configured to simultaneously apply a first transmitter signal to the first transmitter electrode and a second transmitter signal to the second transmitter electrode, wherein the first transmitter signal is based on a first one of a plurality of distinct codes and the second transmitter signal is based on a second one of the plurality of distinct codes; and
    a receiver module comprising receiver circuitry coupled to a first receiver electrode and configured to receive a first resulting signal with the first receiver electrode, the first resulting signal comprising effects corresponding to the first and second transmitter signals and a noise component;
    wherein the processing system is configured to determine an estimate of the noise component using a third one of the plurality of distinct codes which is not associated with a transmitter signal.

2. The processing system of claim 1, wherein the first, second, and third digital codes are mutually orthogonal digital codes.

3. The processing system of claim 1, wherein the processing system is further configured to demodulate the first resulting signal using the first and second digital codes to determine indicia of the first and second transmitter signals, respectively.

4. The processing system of claim 1, wherein the processing system is further configured to demodulate the resulting signal to determine positional information for the input object based on the resulting signal.

5. The processing system of claim 1, wherein the processing system is further configured to compare the noise estimate to a predetermined threshold value.

6. The processing system of claim 5, wherein the processing system is further configured to select an operating mode based on whether the noise estimate exceeds the threshold value.

7. The processing system of claim 6, wherein selecting the operating mode comprises adjusting a frame rate at which the input object is sensed in the sensing region.

8. The processing system of claim 1, wherein the receiver module comprises:
   a first descrambler circuit for determining the indicia of the first transmitter signal;
   a second descrambler circuit for determining the indicia of the second transmitter signal;
   a third descrambler circuit for determining a first attribute of the noise component; and
   a fourth descrambler circuit for determining a second attribute of the noise component.

9. The processing system of claim 8, wherein the receiver module further comprises:
   a first multiplier circuit for applying the first digital code to the first descrambler circuit;
   a second multiplier circuit for applying the second digital code to the second descrambler circuit; and
   a third multiplier circuit for applying the third digital code to the third descrambler circuit.

10. The processing system of claim 1, wherein:
   the transmitter module is coupled to N ohmically isolated transmitter electrodes and configured to apply a unique one of N transmitter signals to each transmitter electrode, wherein the N transmitter signals are distinct digital codes;
   the receiver circuitry is coupled to M ohmically isolated receiver electrodes, each configured to receive a respective resulting signal;
   N and M are positive integers; and
   the receiver circuitry comprises (N+1) discrete descrambler circuits for each of the M receiver electrodes.

11. The processing system of claim 10, wherein the processing system is configured to determine a respective estimated noise component for each of the M receiver electrodes.

12. The processing system of claim 1, wherein the receiver circuitry comprises a second receiver electrode configured to receive a second resulting signal, and the processing system is further configured to determine positional information for at least two input objects in the sensing region based on the first and second resulting signals.

13. The processing system of claim 1, wherein the plurality of distinct digital codes is based on one of a group consisting of Pseudo-Random codes, Hadamard codes, Walsh-Hadamard codes, m-sequences, Gold codes, Kasami codes, Barker codes, and delay line multiple tap sequences.

14. A sensing device comprising:
   a plurality of transmitter electrodes;
   a plurality of receiver electrodes; and
   a processing system individually coupled to each of the plurality of transmitter electrodes and the plurality of receiver electrodes, the processing system configured to:
   simultaneously apply a first transmitter signal to a first transmitter electrode of the plurality of transmitter electrodes and a second transmitter signal to a second transmitter electrode of the plurality of transmitter electrodes, wherein the first transmitter signal is based on a first one of a plurality of distinct digital codes and the second transmitter signal is based on a second one of the plurality of distinct digital codes;
   receive resulting signals with the plurality of receiver electrodes, wherein each resulting signal comprises: i) effects corresponding to the first and second transmitter signals; and ii) a noise component; and
   determine an estimate of the noise component for each resulting signal using a third one of the plurality of distinct digital codes.

15. The sensing device of claim 14, wherein the third one of the plurality of distinct digital codes is not associated with a transmitter signal.

16. The sensing device of claim 14, wherein the first, second, and third digital codes are mutually orthogonal and based on one of a group consisting of Pseudo-Random codes, Walsh-Hadamard codes, m-sequences, Gold codes, Kasami codes, Barker codes, and delay line multiple tap sequences.

17. The sensing device of claim 14, wherein the processing system is further configured to:
   demodulate the resulting signals to determine positional information for an input object based on the resulting signals; and
   compare the noise estimates to a predetermined threshold value, and to select an operating mode based on whether at least one of the noise estimates exceeds the threshold value.

18. The sensing device of claim 14, wherein the processing system comprises, for each receiver electrode, a first filter for isolating indicia of the first transmitter signal, a second filter for isolating indicia of the second transmitter signal, and a noise filter for isolating a respective noise component.

19. A method for capacitive sensing, the method comprising:
   simultaneously applying a first transmitter signal to a first transmitter electrode and a second transmitter signal to a second transmitter electrode, wherein the first transmitter signal is based on a first one of a plurality of distinct digital codes and the second transmitter signal is based on a second one of the plurality of distinct digital codes;
   receiving resulting signals with a plurality of receiver electrodes, wherein each resulting signal comprises effects corresponding to the first and second transmitter signals and an interference component; and
   determining an estimate of the interference component using a third one of the plurality of distinct digital codes.

20. The method of claim 19, wherein determining comprises:
   multiplying the resulting signal by the third digital code using a descrambler circuit.

* * * * *